(12) United States Patent
Manter et al.

(10) Patent No.: US 6,285,637 B1
(45) Date of Patent: Sep. 4, 2001

(54) METHOD AND APPARATUS FOR AUTOMATIC SECTOR FORMAT IDENTIFICATION IN AN OPTICAL STORAGE DEVICE

(75) Inventors: Venitha L. Manter; David A. Fechser, both of Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/210,284

(22) Filed: Dec. 11, 1998

(51) Int. Cl.[7] ....................................................... G11B 7/00
(52) U.S. Cl. ..................... 369/47.1; 369/53.2; 369/53.41
(58) Field of Search ................... 369/47, 48, 49, 369/50, 54, 58, 59, 94, 47.1, 47.14, 53.1, 53.11, 53.15, 53.2, 53.41, 53.44, 59.1; 360/48, 51, 53

(56) References Cited

U.S. PATENT DOCUMENTS

| 4,805,090 | 2/1989 | Coogan | 364/200 |
|---|---|---|---|
| 5,233,592 | 8/1993 | Suzuki et al. | 369/59 |
| 5,239,382 | 8/1993 | Hatakenaka et al. | 358/335 |
| 5,331,423 | * 7/1994 | Ota et al. | 360/99.06 X |
| 5,335,216 | 8/1994 | Suzuki et al. | 369/59 |
| 5,477,512 | 12/1995 | Kubo et al. | 369/32 |
| 5,592,640 | 1/1997 | Minoura et al. | 395/428 |
| 5,768,044 | 6/1998 | Hetzler et al. | 360/77.08 |

* cited by examiner

*Primary Examiner*—Muhammad Edun
(74) *Attorney, Agent, or Firm*—Suiter & Associates

(57) ABSTRACT

A method and apparatus for automatically identifying the format of a sector in an optical storage device. Information on an optical disc is separated into data and subcode streams. The type of optical data is identified, and a first signal is generated to represent the type. Next, if the type is CD-ROM, the mode is identified, and a second signal is generated to represent the mode. Thirdly, if the mode is Mode-2 CD-ROM, the form is identified, and a third signal is generated to represent the form. A single signal may also be used to represent the type, mode, and form. In a CD embodiment, the type is identified by polling a type indicator bit, the mode is identified by polling the mode indicator bits, and the form is identified by comparing a first set of subheader bytes to a second set of subheader bytes, and polling a form indicator bit.

34 Claims, 12 Drawing Sheets

METHOD AND APPARATUS FOR AUTOMATIC SECTOR FORMAT IDENTIFICATION IN AN OPTICAL STORAGE DEVICE

FIELD OF INVENTION

This invention relates to information storage equipment and more particularly to optical information storage equipment.

BACKGROUND OF THE INVENTION

Different types of information can be digitally represented and stored on optically read discs. Compact Disc (CD) drives and Digital Versatile Disc (DVD) drives may be used to read the information from the discs. Examples of media that may be read using a CD or DVD drive are Compact Disc-Digital Audio (CD-DA), Compact Disc-Read Only Memory (CD-ROM), Compact Disc-Recordable (CD-R), Compact Disc-ReWritable (CD-R/RW and CD-RW), and Digital Versatile Disc-Read Only Memory (DVD-ROM).

While all CD formats define sectors having a length of 2352 bytes, the composition of information contained in the sectors differs depending on the format. The data size may be less than the full 2352 bytes if other information, such as error checking or correction coding, is included within the sector. CD-DA discs contain digitally encoded audio information organized into sectors containing 2352 bytes of data without sector level error checking or correction capabilities. In comparison, CD-ROM discs contain a variety of digital computer data including text, data records, and multimedia information such as graphics, audio, and video. Information on CD-ROM discs may be organized according to a variety of different sector formats, as indicated by a sector's MODE and FORM data fields.

For example, a standard (Mode-1) CD-ROM sector contains 2048 bytes of data, but a multimedia (Mode-2, Form-2) CD-ROM/XA sector contains 2324 bytes of data. There are three modes defined for CD-ROM. These are Mode-0, Mode-1, and Mode-2. The currently defined Modes in the CD-ROM specification are shown below in Table 1.

TABLE 1

| Mode | Data Size | Characteristics |
| --- | --- | --- |
| Mode-0 | 2336 Bytes | Contains all zeros in the data field |
| Mode-1 | 2048 Bytes | Contains real data in addition to error-detection and correction capabilities |
| Mode-2 | No Form 2336 Bytes | |
| | Form-1 2048 Bytes | Contents further depend on the Form Field |
| | Form-2 2324 Bytes | |

A Mode-2 sector format may further be one of several defined forms: "No Form," Form-1, or Form-2. The currently defined forms for a Mode-2 CD-ROM sector and the available features are shown below in Table 2.

TABLE 2

| MODE 2 FORM | Synchronization Field | Header Field | Subheader & Duplicate Subheader Field | Data Field | Error Detection Field | Error Correction Field |
| --- | --- | --- | --- | --- | --- | --- |
| No Form | Yes | Yes | No | Yes | No | No |
| Form-1 | Yes | Yes | Yes | Yes | Yes | Yes |
| Form-2 | Yes | Yes | Yes | Yes | No | No |

As seen in the tables above, error detection and correction depend on the sector type and format of the CD-ROM. While CD-DA discs typically contain no sector level error detection or correction, a CD-ROM may or may not contain error detection and/or correction information depending on the sector format indicated by the mode and form fields.

Systems capable of reading different formats of optical discs must be able to differentiate between the formats to properly read and access the stored information. Typically, software or firmware has been used to examine the mode and form fields of the sector format to determine the format of a CD-ROM. These software and firmware techniques require a microcontroller or microprocessor to frequently access the stored information to determine its format. Accessing the sector fields to determine the mode and form causes delays that may result in bottlenecks for the drive. This is especially true as the speed of CD-ROM data reads becomes faster. In the early 1990's CD-ROM's were operating at up to the quad-speed (4×) level. In 1998, it is not uncommon to find CD-ROM's operating at 32× and beyond. As speeds have increased, challenges have arisen in the area of error detection and correction, as well as in other areas dependant on control of the CD sectors being serially transferred from the disc to the buffer.

As CD-ROM speeds increase, there is an increased need for fast buffer accesses. In order to effectively stream data from the optical disc to the host computer or device, it becomes desirable to reduce the delays associated with frequent microprocessor or microcontroller accesses. Needed is a device to determine the information storage format that minimizes the impact on system resources.

Economic pressures are making it more desirable to use less expensive, lower performance microprocessors and microcontroller. When used with existing format detection and selection systems, these lower performance devices make it more difficult to achieve high data access speeds.

Hardware has been used to automate and streamline a limited portion of the format identification process, such as detecting the Q-Channel CD-ROM bit to determine whether the current sector is a CD-ROM sector. However, it would be desirable to use logic circuitry in conjunction with other hardware to automate the entire process, including identification of mode and form, in order to improve access speeds while allowing the use of less expensive, lower performance microprocessors and microcontrollers.

SUMMARY OF THE INVENTION

In accordance with an illustrative embodiment of the present invention, problems associated with identifying the format of a sector from an optical disc, and automatically adjusting the size of the data field in buffer memory are addressed. In an illustrative embodiment, the present invention provides a method and apparatus for efficiently determining the type, mode, and form of information on a sector of an optical disc, and for setting the data field size and organization based on the type, mode, and form. A novel hardware-based solution is presented, resulting in faster operation than the software/firmware-based solutions typically in use today.

The sector must first be determined to be a CD-DA type or CD-ROM type sector. A CD-DA sector consists entirely of audio data with no sector level error checking/correcting capabilities. A CD-ROM sector can be any one of several formats, requiring further differentiation after the first step of determining the type is complete.

To automatically determine whether the sector is CD-DA or CD-ROM data, the sector information on the CD is split into a data portion and a subcode portion. In the preferred embodiment, the decoder logic examines the subcode to determine the type of disc. The subcode may further comprise a plurality of channels. One of the plurality of channels, the Q-channel in the present embodiment, includes control information regarding the type of the disc. Decoder logic determines the type of the sector by automatically decoding the Q-channel as it is received from the disc. The first full byte of data in the Q-Channel contains a data-type indicator bit (bit-6), called the CD-ROM bit, which differentiates between CD-ROM data (the bit is set high) and CD-DA data (the bit is set low).

If a CD-ROM sector is detected, the decoder logic determines the mode of the CD-ROM sector. To automatically determine the mode of a CD-ROM sector, the decoder logic detects the header field, extracts the mode byte, and determines the proper mode of the sector. In this present example, CD-ROM sectors generally begin with a 12-byte "Sync" field followed by a 4-byte "Header" field. The fourth byte of the header field is the mode byte. Bits 1:0 of this byte are used to determine the mode of the sector.

If a Mode-2 sector format is detected, the decoder logic further determines the form of the sector. This invention uses hardware to detect the existence of a subheader field, extract the submode byte, and determine the proper form of the sector. The subheader field of a Mode-2 sector consists of four bytes of information repeated once (a total of eight bytes). The third and seventh byte is the "submode" byte and contains the form information. The first four-subheader bytes are compared with the second four subheader (duplicate subheader) bytes. If the bytes do not match, then the sector is determined to be "no form." If the bytes do match, then the fifth bit of the third subheader byte is polled. If it has a low logic level, the sector is Form-1. If it has a high logic level, the sector is Form-2.

Upon a request from the host to initiate a read of information from a CD, a sector of information is transferred from the CD across a serial interface to a buffer. Once the information from the CD is present in the buffer, the information may be acted upon differently depending on what kind of information it is. The information in the buffer is processed by the host interface.

The host interface is able to quickly identify the sector type of each sector to be transferred, by using a normally unused byte location in the buffer's sector map. This byte (the "MDFM byte") is stored with a binary code that is different for each possible sector format. When the host requests a read of the data field, the host interface logic reads the MDFM byte first, before reading any other part of the sector map, in order to determine the sector type of the current sector.

After the sector type of the current sector has been identified, it is then possible to adjust the size of the data field. The host interface is able to define multiple fields to be read out of the sector map. The data field size can be automatically adjusted to match the sector type by defining a special field ( "Field-A"). Field-A is set to load only the data field from the sector map. The size of this data field is set automatically for each sector based on the value of the sector's MDFM byte. If the data field is not wanted, Field-A is disabled during transfers.

The foregoing and other features and advantages of an illustrative embodiment of the present invention will be more readily apparent from the following detailed description, which proceeds with references to the accompanying drawings.

BRIEF DESCRIPTION OF THE DRAWINGS

These and other objects, advantages, and features of the invention will appear for purpose of illustration, but not of limitation, in connection with FIGS. 1–12, wherein like numbers refer to like parts throughout and in which.

DETAILED DESCRIPTION OF AN ILLUSTRATIVE EMBODIMENT

Optical Storage Format Identification Method and Circuitry

Figure 1:
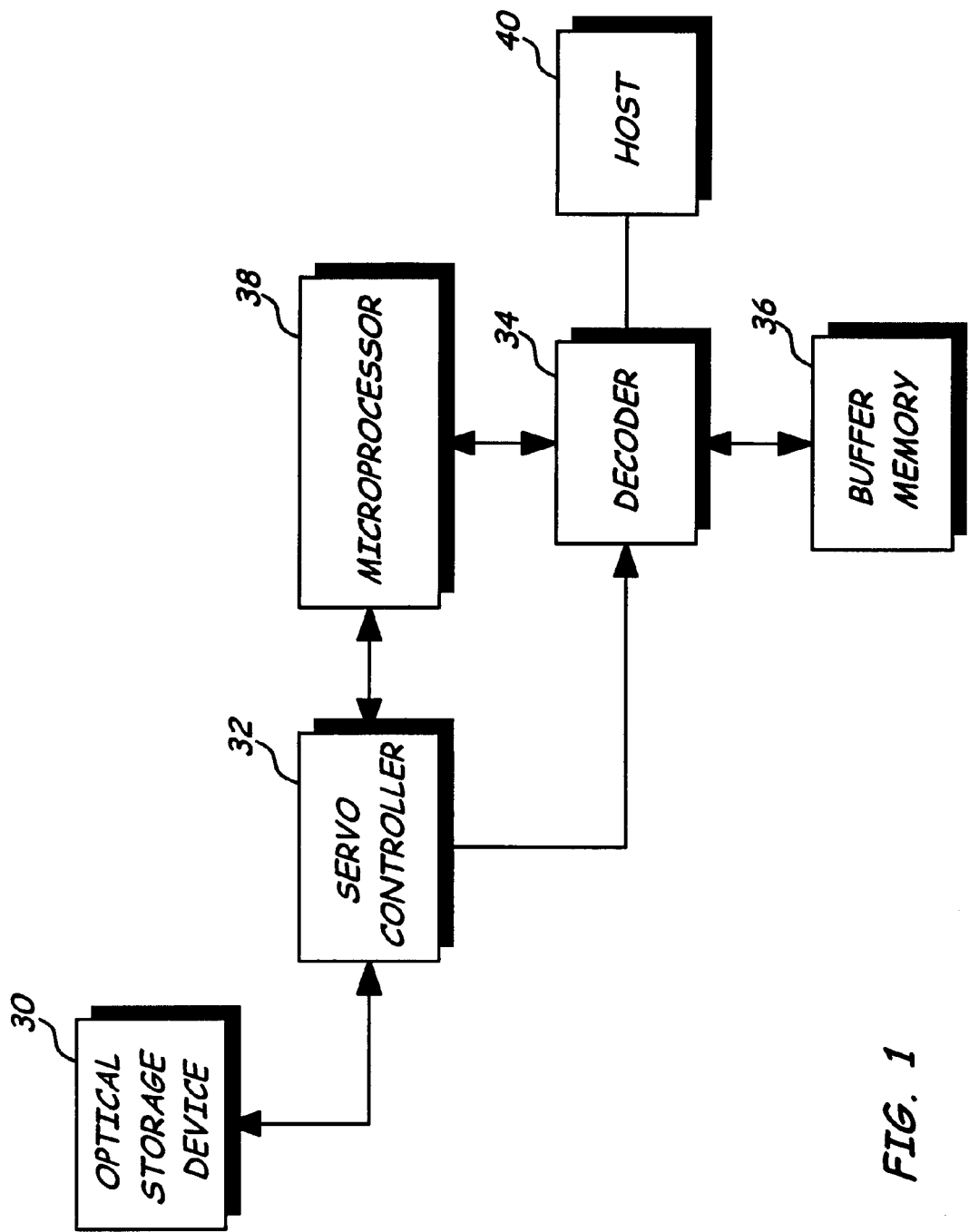
FIG. 1 is a block diagram illustrating an optical storage read system.

FIG. 1 is a block diagram showing an example of a system for reading information from an optical storage device. Optical storage device 30 may be a CD device, or a DVD device, for example. Optical storage device 30 typically includes a spindle motor, a source of light for shining a beam onto the surface of the disk, and an optical pickup for sensing the reflected light beam. The patterns of reflected light correspond to bits of information contained on the disk. Optical storage devices are well known, and detailed description thereof will not be given.

Servo controller 32 drives the spindle motor in optical storage device 30 and performs other functions related to control of the optical storage device 30. Additionally, raw data from optical storage device 30 is decoded into sector formatted data by servo controller 32.

Decoder 34 detects the format of the optical information, performs error checking and correction, performs data extraction and organization functions, and performs other functions to assist in the retrieval of data from the optical storage device.

Buffer memory 36 serves as a temporary storage location for data, format information, and other information relating to the optical information and data. Decoder 34 coordinates the organization and content of buffer memory 36.

Servo controller 32 and decoder 34 are controlled by microprocessor 38.

Host 40 may be a personal computer (PC) or other device that utilizes data extracted by decoder 34 from information contained on the disk in the optical storage device 30.

Figure 2:
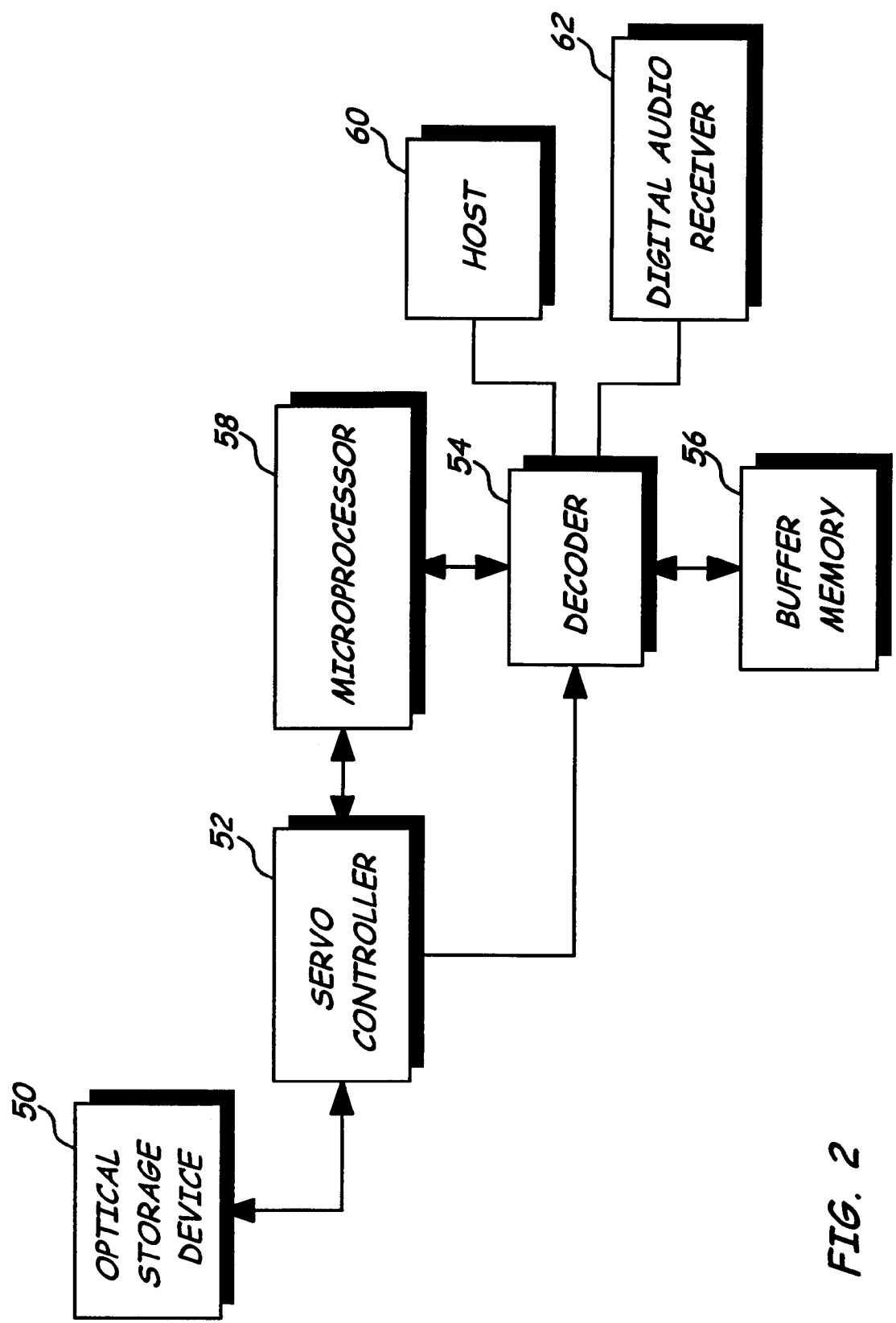
FIG. 2 is a block diagram illustrating an optical storage read system having a digital audio output.

FIG. 2 shows a system for reading information from an optical storage device, having a direct output to a digital audio output.

Figure 3:
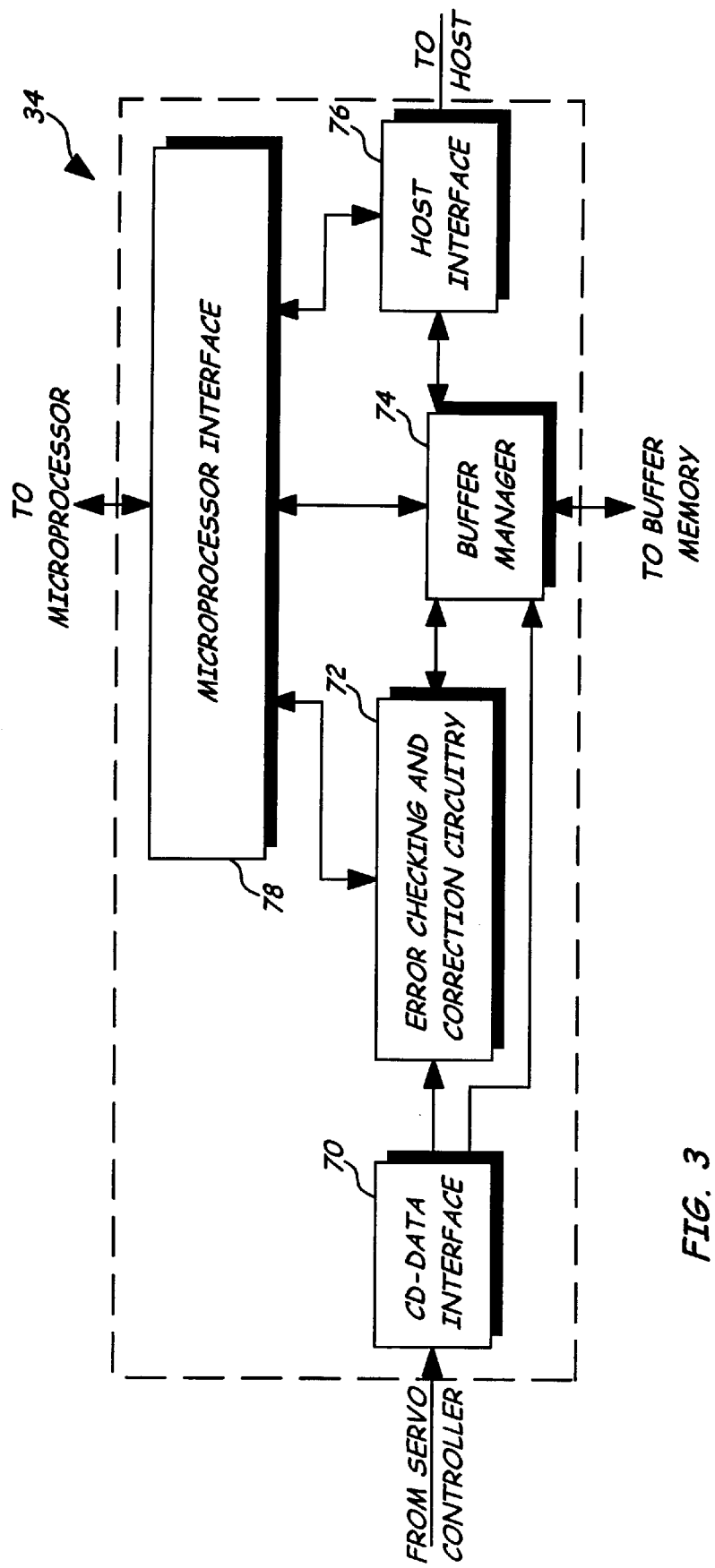
FIG. 3 is a block diagram illustrating a decoder.

Optical storage device 50, servo controller 52, buffer memory 56, and microprocessor 58 are similar to optical storage device 30, servo controller 32, buffer memory 36, and micro-processor 38, respectively, in FIG. 1. Decoder 54 provides an audio interface for providing audio data directly to the digital audio receiver 62, for further processing thereof FIG. 3 is a simplified block diagram of decoder 34 from FIG. 1. Decoder 34 includes CD-Data interface 70, error checking and correction circuitry (ECC) 72, buffer manager 74, host interface 76, and microprocessor interface 78. Decoder 34 may be implemented within a single chip or an integrated circuit (IC). CD-Data interface 70 is responsible for monitoring the sequence of information received from the servo controller 32. In one embodiment, a digital information stream received from servo controller 32 is in one of three formats: CD-DA, CD-ROM, or CD-ROM/XA. CD-Data interface 70 is capable of accommodating interruptions in the data stream received from servo controller 32. CD-Data interface 70 is also capable of sensing the next sequential series of data so it does not create overlapped or gapped data in the buffer memory 36. CD-Data interface 70 is responsible for determining the format of the incoming stream. Some formats, such as CD-DA, require no error checking or correction, while other formats, such as CD-ROM and CD-ROM/XA, require varying, predetermined levels of error checking and correction.

The CD-Data interface 70 sends data requiring error checking and correction to error checking and correction (ECC) circuitry 72. In one embodiment, ECC circuitry 72 performs REED-SOLOMON third-level CD-ROM error correction on a data block on the fly. This method of error correction is well known. Syndromes and error flags are provided by the servo controller 32. Data is only corrected to the point that data transfer speed is not hindered. Data such as CD-DA format data that does not require error checking or correction is sent directly to buffer manager 74.

Buffer manager 74 controls the buffer memory 36, which may be any form of standard Random Access Memory (RAM), such as EDO-DRAM, for example. Buffer manager 74 also manages the transfer of data from the buffer memory to the host via host interface 76. Buffer manager 74 automatically maintains the integrity of the data in the buffer memory through refresh cycles. Buffer manager 74 also arbitrates requests for access to the buffer memory.

Host interface 76 provides the interface to the host bus. In the preferred embodiment the host bus is a serial bus conforming to the IEEE 1394 standard. Host interface 76 places data into packets for transport onto the host bus. Additionally, host interface 76 may receive commands from the host across the host bus. The host interface 76 then may pass them on to microprocessor 38, which is used as the controller.

Microprocessor interface 78 provides an interface to the microprocessor 38. In the preferred embodiment, microprocessor 38 and buffer memory 36 are located off-chip. An on-chip microprocessor and/or buffer memory may be used depending on the amount of integration desired.

Figure 4:
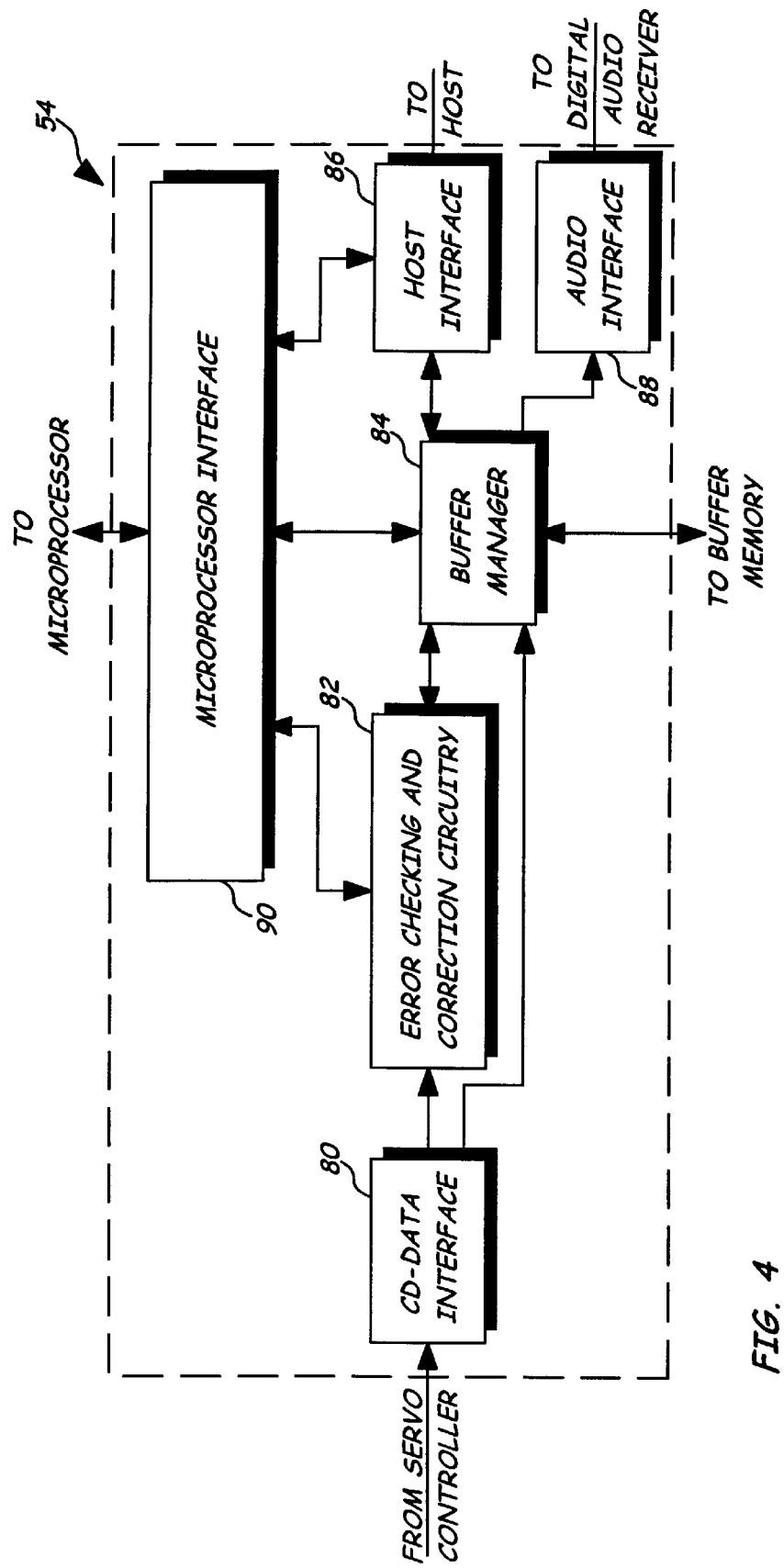
FIG. 4 is a block diagram of a decoder having a digital audio output.

FIG. 4 is a simplified block diagram of decoder 54 from FIG. 2. Decoder 54 includes CD-Data interface 80, error checking and correction circuitry 82, buffer manager 84, host interface 86, audio interface 88, and microprocessor interface 90. Host interface 54 may be implemented within a single chip or an integrated circuit (IC). A clock generates a timing signal for coordinating chip operations with the incoming bits of the digital information stream.

CD-Data interface 80 is responsible for monitoring the sequence of information received from the servo controller 52. In one embodiment, information received from servo controller 52 is in one of three formats: CD-DA, CD-ROM, or CD-ROM/XA.

The architecture of CD-Data interface 80 is designed to be capable of accommodating interruptions in the data stream received from servo controller 52. The CD-Data interface 80 is designed to sense the next sequential series of data so it does not create overlapped or gapped data in the buffer memory 56. A serial-to-parallel converter processes the incoming bits of the digital information stream according to the clock signals.

One of the functions of CD-Data interface 80 is to determine the format of the incoming data. Some data formats, such as CD-DA, require no error checking or correction, while other formats, such as CD-ROM and CD-ROM/XA, require varying, predetermined levels of error checking and correction. Therefore, it is necessary to determine the format of the incoming data to assist in further data processing and manipulation.

The CD-Data interface 80 sends data requiring error checking and correction to error checking and correction (ECC) circuitry 82. In one embodiment, ECC circuitry 82 performs REED-SOLOMON third-level CD-ROM error correction on a data block on the fly. This method of error correction is well known. Syndromes and error flags are provided by the servo controller 52. Data such as CD-DA format data that does not require error checking or correction may be sent directly to buffer manager 84, for example.

Buffer manager 84 controls the buffer memory 56, which may be standard or EDO-DRAM in one embodiment. Buffer manager 84 also manages the transfer of data from the buffer memory 56 to the host bus via host interface 86. Buffer manager 84 automatically maintains the integrity of the data in the buffer memory through refresh cycles. Buffer manager 84 also arbitrates requests for access to the buffer memory.

Host interface 86 provides the interface to the host bus. In the preferred embodiment the host bus is a serial bus conforming to the EEE 1394 standard. Host interface 86 places data into packets for transport onto the bus. Additionally, host interface 86 may receive commands from the host across the host bus. The host interface 86 then may pass them on to microprocessor 90, which is used as the controller.

Microprocessor interface 90 provides an interface to the microprocessor 58. In the preferred embodiment, microprocessor 58 and buffer memory 56 are located off-chip. An on-chip microprocessor and/or buffer memory may be used depending on the amount of integration desired. In the preferred embodiment, microprocessor interface 90 supports separate parallel and multiplexed address and data buses with the associated control signals. Microprocessor interface 90 may allow firmware to be downloaded across the host bus to the microprocessor, which may store the code on a flash ROM.

Figure 5:
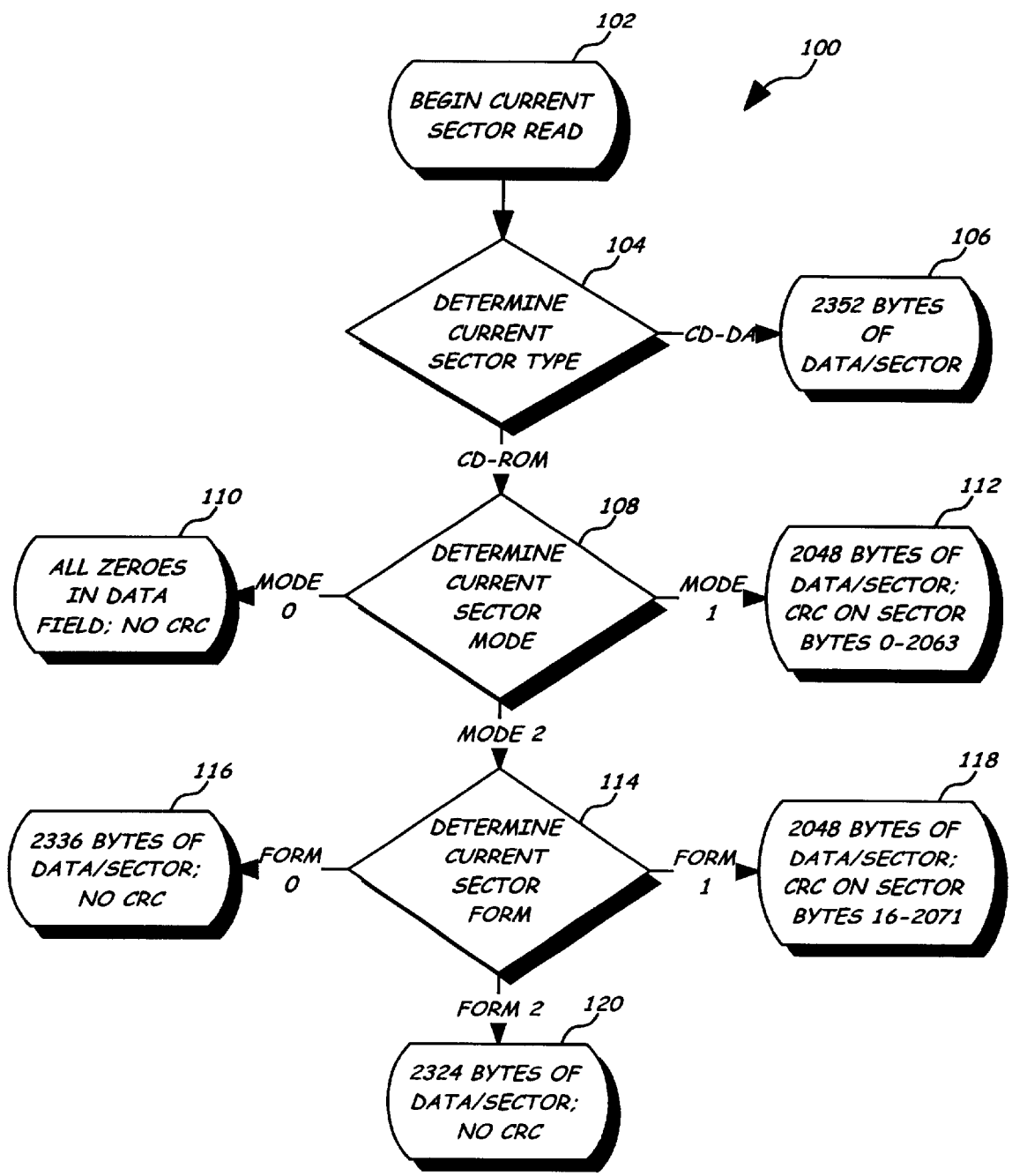
FIG. 5 is a flow diagram illustrating a method for determining the format (type/mode/form) of a data sector on an optical disc.

FIG. 5 is a flow diagram illustrating a method 100 for determining the format of a sector being read from an optical disc. At step 102, a sector is received by the CD-Data Interface from the servo controller. In step 104, the sector is examined to determine its type. If it is determined that the current sector is of the CD-DA type, then there is no need to determine the mode or form of that sector, and the sector has 2352 bytes of data per sector as is shown in step 106. If, however, the current sector is of the CD-ROM type, then the current sector must be examined to determine its mode, as is shown in step 108. If it is determined that the current CD-ROM sector is Mode-0, then the current sector consists of all zeroes in the data field, and there is no error checking or correction, as is shown in step 110. If the current CD-ROM sector is Mode-1, then there are 2048 bytes of data per sector and error checking and correction exists in the form of Cyclic Redundancy Check (CRC) on sector bytes 0–2063, as is shown in step 112. If the current CD-ROM sector is Mode-2, then the sector is examined to determine its form, as is shown in step 114. If the Mode-2 CD-ROM sector is "No Form", then there are 2336 bytes of data per sector, and there is no error checking or correction, as is shown in step 116. If the current Mode-2 CD-ROM sector is Form-1, then there are 2048 bytes of data per sector, and error checking and correction exists in CRC coding on sector bytes 16–2071, as is shown in step 118. If the current Mode-2 CD-ROM sector is Form-2, then there are 2324 bytes of data per sector, and no error checking or correction exists, as is shown in step 120.

Figure 6:
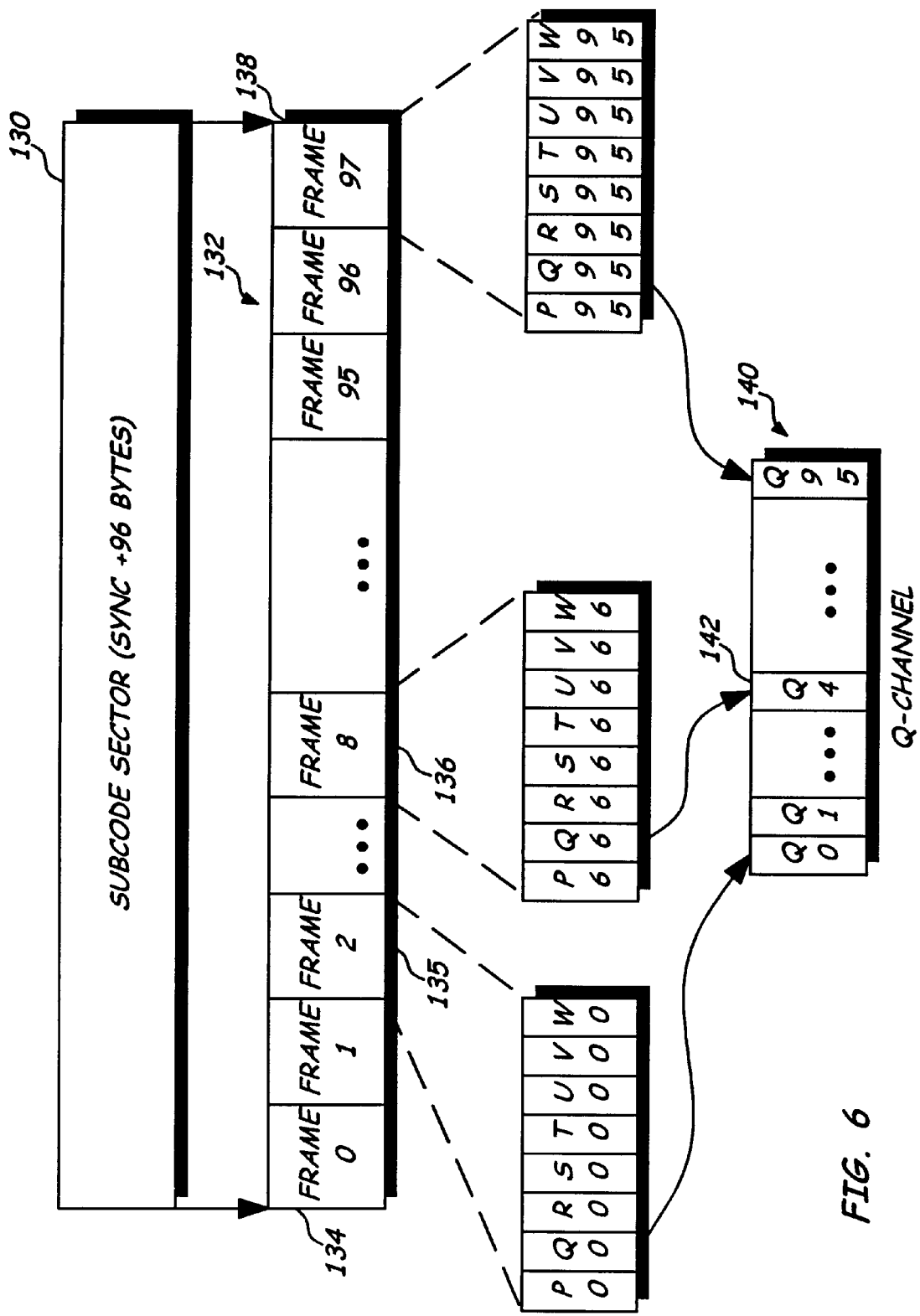
FIG. 6 is a block diagram illustrating a Q-channel structure.

FIG. 6 shows the composition and the construction of a Q-channel in a CD. Other types of optical storage may have a similar subcode arrangement. Information on a CD may exist as data or subcode. In a preferred embodiment of the invention, interleaved information from the optical storage device is separated into two separate information streams by the servo controller circuitry. One of the streams carries data (the "data portion"), while the other stream carries subcode corresponding to the data (the "subcode portion").

Subcode sector 130 consists of 96 bytes. Information in subcode sector 130 is further broken down into frames 132. There are 98 frames numbered consecutively from Frame-0 to Frame-97. The first two frames, Frame-0 and Frame-1, are used for synchronization and contain no subcode. Each succeeding frame consists of 8 bits labeled P, Q, R, S, T, U, V, and W. For example, Frame-0 is represented by 134 in FIG. 6. Frames 2 through 97 contain the subcode information. Frame-2, represented by 135 in FIG. 6, contains the first byte of subcode information. The bits for Frame-2 are numbered P0, Q0, R0, S0, T0, U0, V0, and W0. Frames 3 through 97 are similarly numbered. For example, the bits in Frame-8, represented by 136 in FIG. 6, are shown as P6, Q6, R6, S6, T6, U6, V6, and W6. Similarly, for Frame-97, represented by 138 in FIG. 6, the bits are P95, Q95, R95, S95, T95, U95, V95, and W95.

As Frames 0 to 97 are serially read into the decoder, the Q-channel is formed by combining all of the Q bits in one periodic channel. The Q-channel is stored in registers to allow for easy access to the subcode information stored therein.

The Q-channel contains control information for the current sector. Q-channel 140 is made up of frame bits Q0, Q1, Q2, ..., Q97. The first full byte of data in the Q-channel contains a data type indicator bit (bit-6), called the CD-ROM bit, which differentiates between CD-ROM data (the bit is set high) and CD-DA (the bit is set low). Bit Q6, 142, of Q-channel 140 is the CD-ROM bit. If the value of Q6 is 1, then the sector is a CD-ROM sector. If the value of Q6 is 0 then the sector is a CD-DA sector. Q-channel 140 is stored in a register, where the Q6 bit, 142, may be polled when needed.

For more information on the organization of information on optical discs refer to the Compact Disc Digital Audio Standard introduced by Philips and Sony, commonly known as "the Red Book," the Compact Disc Read-Only Memory Standard introduced by Philips and Sony, commonly known as "the Yellow Book," the CD-ROM/XA Standard introduced by Philips, Microsoft, and Sony, the Compact Disc Interactive (CD-I) Media Standard, commonly known as "the Green Book," ISO 9660, and the Optical Storage Technology Association (OSTA) MultiRead Specifications for CD-ROM, CD-R, CD-RIRW, & DVD-ROM Devices Revision 1.11, Oct. 23, 1997, all of which are expressly incorporated herein by reference.

Figure 7:
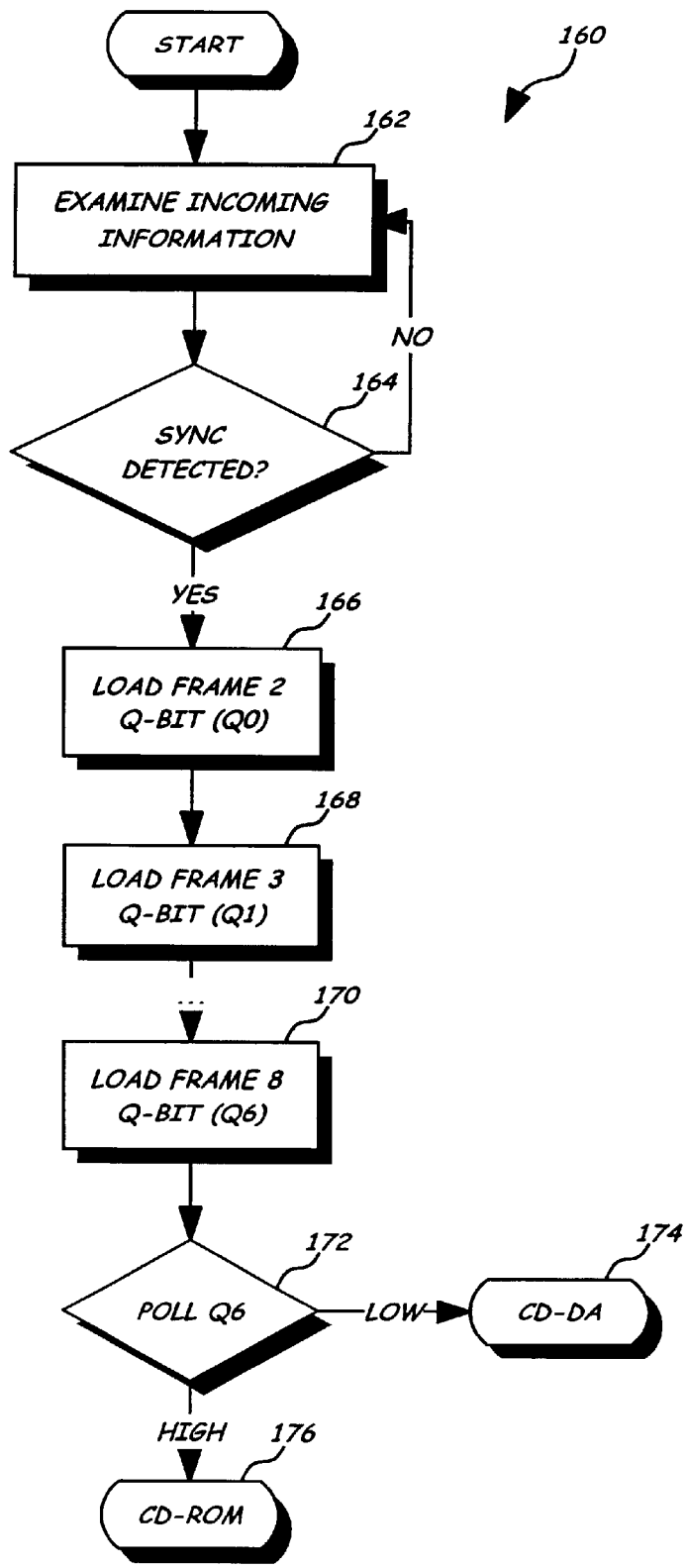
FIG. 7 is a flow diagram illustrating a method for determining the type of a compact disc.

FIG. 7 shows a method 160 for determining the type of optical disc being read. The method begins with an examination of incoming information, as is shown by step 162. Incoming subcode information is temporarily stored in a first register while it is examined. Sector type identification logic then determines whether the subcode synchronization has been detected, as is shown in step 164.

If the subcode synchronization has been detected, then the sector type identification logic begins decoding the Q-channel. Q0, the Q bit from Frame-2, is loaded into a register as is shown in step 166. Next, Q1, the Q bit from Frame-3, is loaded into the register as is shown in step 168. This process continues until at least Q6 has been loaded into the register as is shown by step 170. Once Q6 has been loaded, the value of Q6 may be polled to determine whether it has a high or low logic level, as is shown by step 172. If the Q6 bit is low, then the current sector is a CD-DA sector, as is shown by 174. If the Q6 bit is high, then the current sector is a CD-ROM sector, as is shown by 176. The sector type identification logic may be implemented by using a first comparator. A first signal carrying a representation of the type determination, such as a binary representation, is generated for further reference within the host interface.

If the sector is a CD-DA sector then there is no need to determine the mode or form because none exists for a CD-DA sector. However, if the current sector is a CD-ROM sector, then the mode and the form of the sector may be determined.

Figure 8:
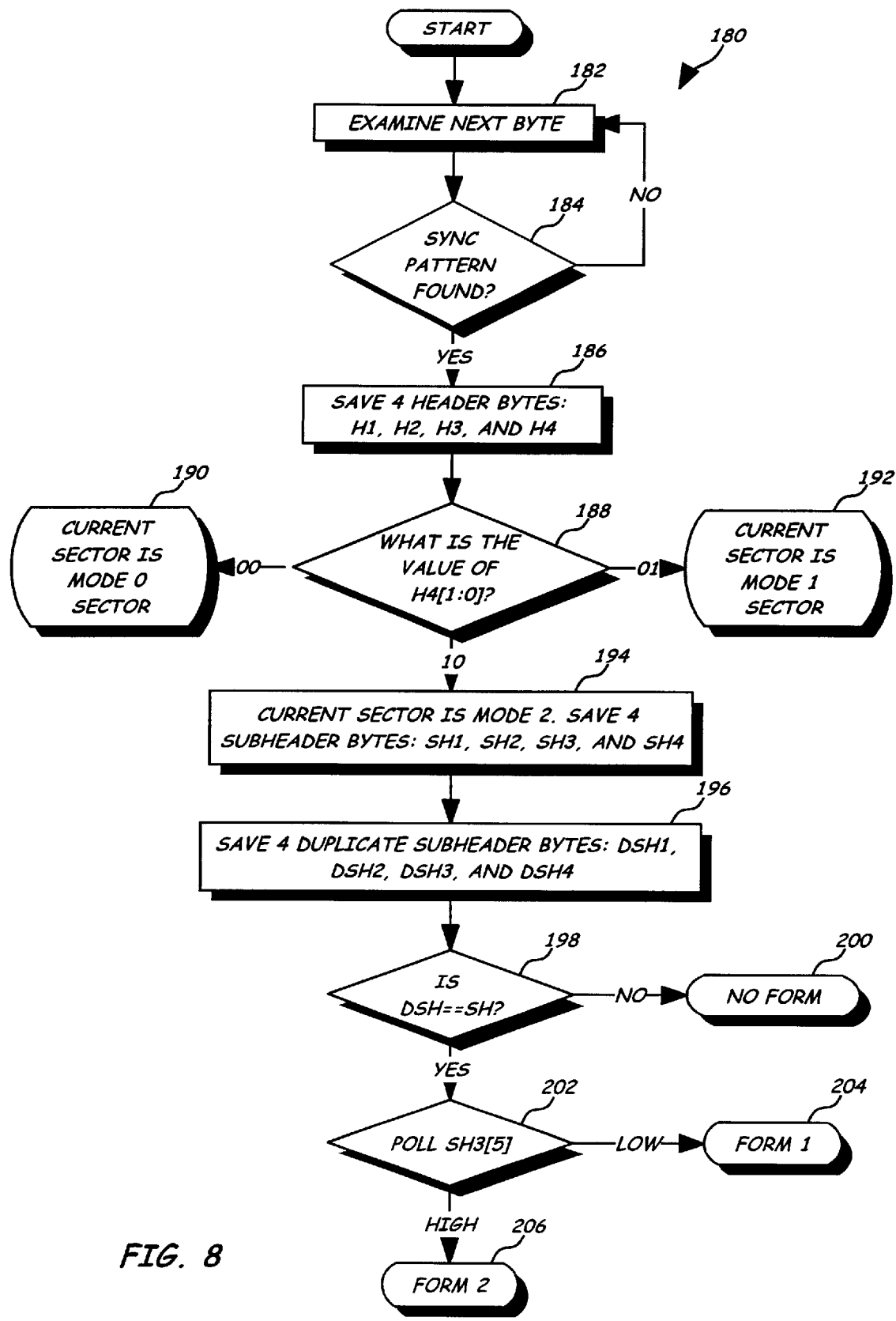
FIG. 8 is a flow diagram illustrating a method for determining the mode and form of a compact disc.

FIG. 8 shows a method 180 for determining the mode and form of a CD-ROM sector. In contrast for the method for determining the type of a CD sector, in which the information being examined was the subcode, the method for determining the mode and form of a CD-ROM sector requires an examination of the data sector instead of the subcode sector.

First, the incoming data is examined as it is received by the host interface, as is shown in step 182. The incoming data is temporarily stored in a second register while it is examined. It is then determined whether a synchronization (SYNC) pattern has been found, as is shown in step 184. If the SYNC pattern has not been found, then step 182 is repeated and the next incoming information is examined. If the SYNC pattern has been found, then a second counter identifies a header within the data. Four header bytes are saved in registers, as is shown in step 186. In the preferred embodiment, the registers are made up of 32 flip-flops to save the four header bytes (H1, H2, H3, and H4).

After the four header bytes (H1, H2, H3 and H4) are saved in the registers, the value of the mode indicator bits (bits 1 and 0) of the fourth header byte (H4) are examined by sector mode identification logic, as is shown in step 188. If the value of H4(1:0) is 00, then the current sector is a Mode-0 sector, as is shown in step 190. If the value of H4(1:0) is 01, then the current sector is Mode-1 sector, as is shown in step 192. If the value of H4(1:0) is 10, then the current sector is Mode-2, as is shown in step 194. Sector mode identification logic may be a second comparator for decoding the header to determine the mode. A signal representing the mode of the CD-ROM sector (the second signal) is generated for future use within the host interface.

The subheader and duplicate subheader, which may be different from each other, are identified by a counter. In the preferred embodiment, this counter is the same counter used to identify the header. The four subheader bytes (SH1, SH2, SH3, SH4) are then saved in registers, as is shown in step 194. Next, four duplicate subheader bytes (DSH1, DSH2, DSH3, DSH4) are saved in registers, as is shown in step 196. The subheader bytes may be referred to as a first set of subheader bytes, and the duplicate subheader bytes may be referred to as a second set of subheader bytes.

The four duplicate subheader bytes (DSH1, DSH2, DSH3, DSH4) are then compared to the four subheader bytes (SH1, SH2, SH3, and SH4) on a bit by bit basis using sector form identification logic, as is shown in step 198. For example, bit 1 of DSH 1 is compared to bit 1 of SH1, bit 2 of DSH1 is compared to bit 2 of SH1, bit 6 of DSH4 is compared to bit 6 of SH4, and similarly for the rest of the bits. Sector form identification logic may be a third comparator for decoding the header and subheader bytes.

If the four duplicate subheader bytes (DSH1, DSH2, DSH3, and DSH4) do not match the four subheader bytes (SH1, SH2, SH3, and SH4), then the Mode-2 CD-ROM sector has no Form, as is shown in step 200. If the four duplicate subheader bytes (DSH1, DSH2, DSH3, and DSH4) do match the four subheader bytes (SH1, SH2, SH3, and SH4), then the fifth bit of the third subheader byte (SH3[5]) is examined using the sector form identification logic, as is shown in step 202. The fifth byte of the third subheader byte (SH3[5]) is also referred to as the form indicator bit.

If SH3[5] has a low logic level (SH3[5]=0), then the Mode-2 CD-ROM sector is Form-1, as is shown in step 204. If SH3[5] has a high logic level (SH3[5]=1), then the Mode-2 CD-ROM sector is Form-2, as is shown in step 206. The form of the sector is represented in a signal (the third signal) which is generated for future reference within the host interface.

Figure 9:
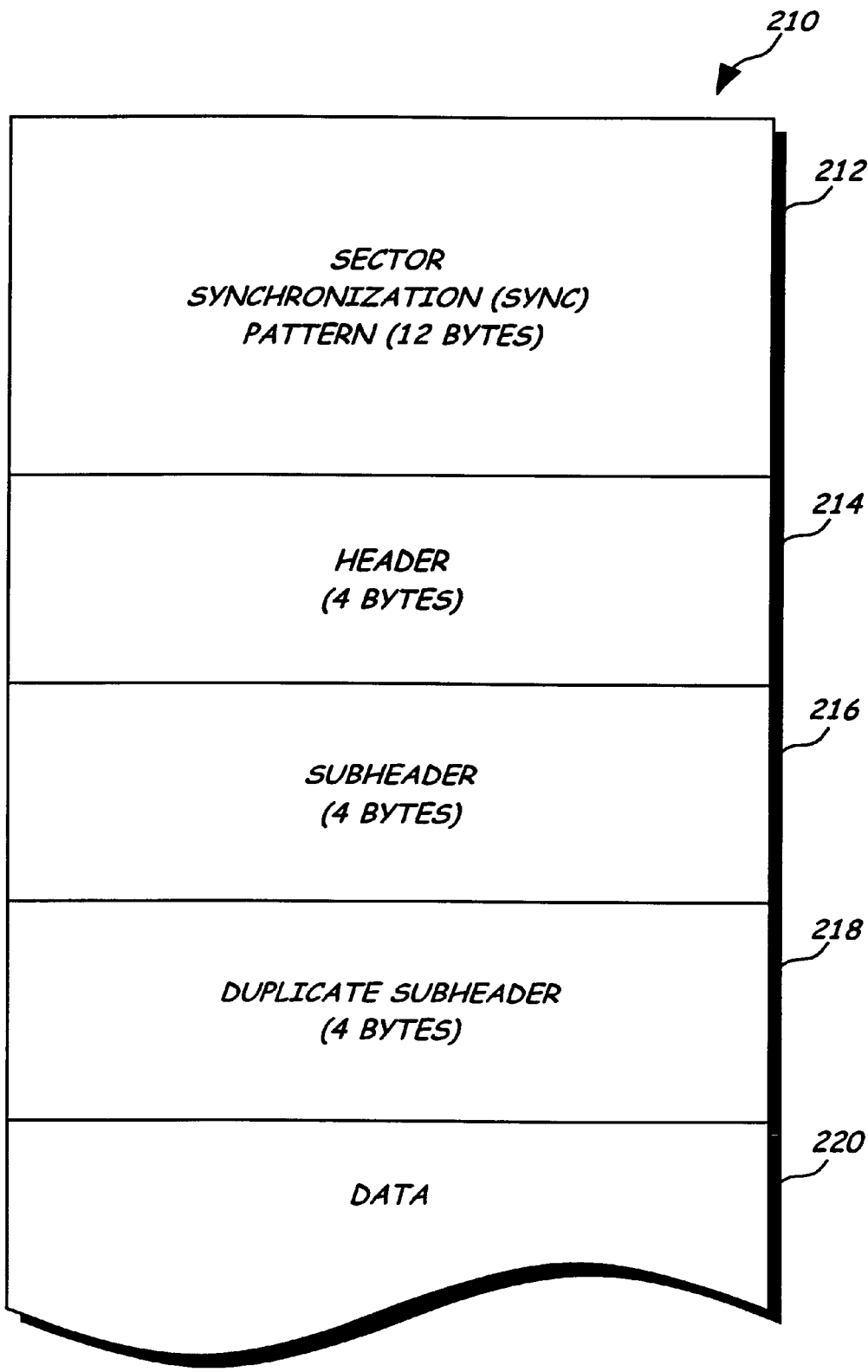
FIG. 9 is a block diagram showing the organization of a Mode-2 CD-ROM data sector.

FIG. 9 shows the organization of a Mode-2 CD-ROM data sector 210 as it is received as a stream from the servo controller circuitry. The data sector 210 includes a sector synchronization (SYNC) pattern 212 that is 12 bytes long. The SYNC pattern consists of all ones except for the first and last bytes, which are zeros. The header 214, subheader 216, and duplicate subheader 218, are each four bytes long. The header, subheader, and duplicate subheader provide control information. The user data portion 220 is received next.

Figure 10:
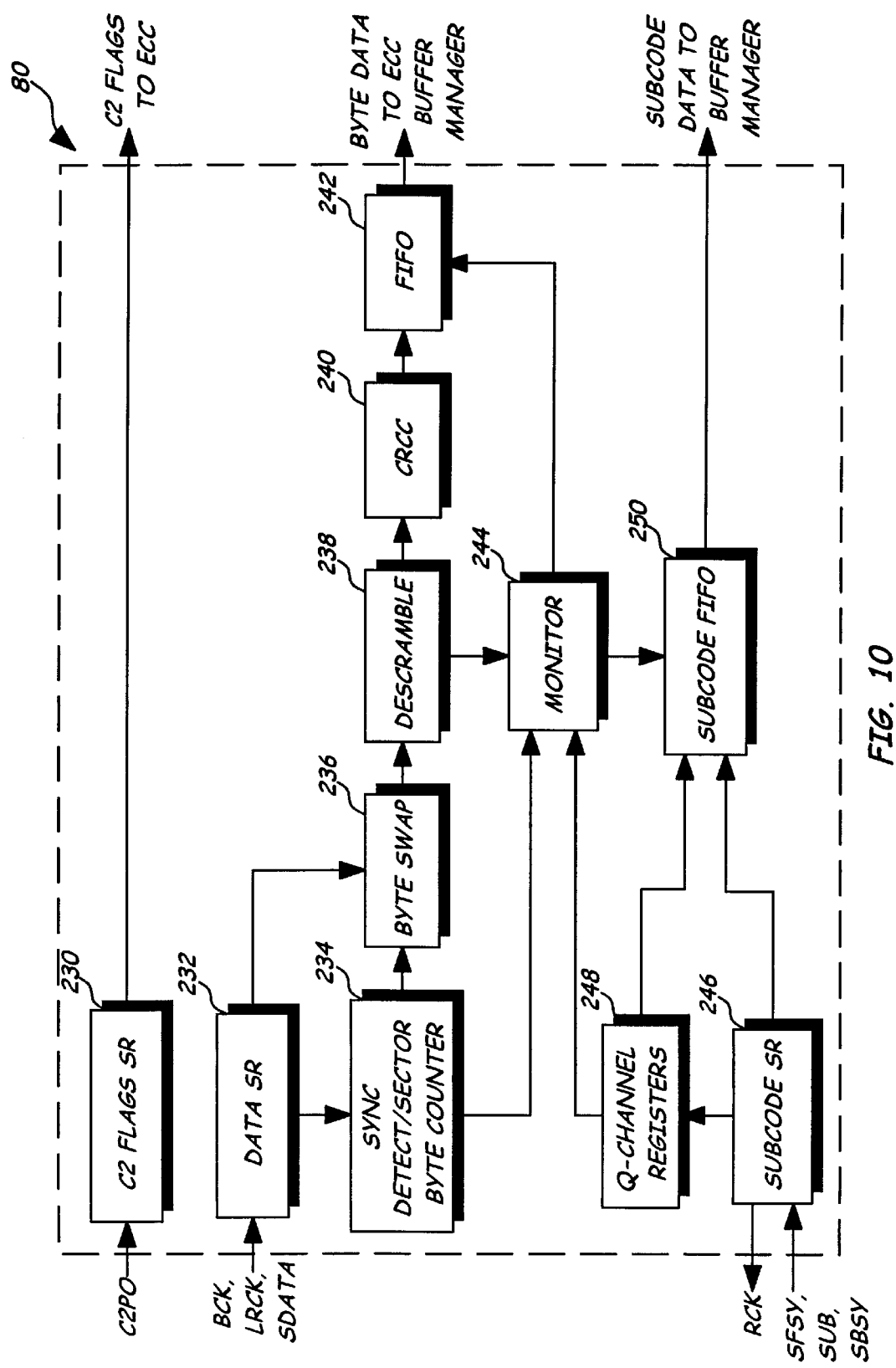
FIG. 10 is a block diagram of a preferred hardware embodiment of a CD-Data interface.

FIG. 10 shows a preferred hardware embodiment for determining the format of the current sector being received by the CD-Data interface 80 from the servo controller circuitry. The same hardware embodiment would be suitable for CD-Data interface 70. C2 Flags SR 230 is a shift register that provides error flags to the Error Checking and Correction (ECC) circuitry. Data SR 232 is a shift register for the serial data SDATA being received from the servo controller circuitry. Data SR 232 is provided timing by clock signal BCK. The SYNC detect/sector byte counter examines the received data for the presence of the SYNC pattern, which indicates the beginning of the current sector. The byte counter functionality indicates when the header and subheader information is available. The byte swap block 236, descrambler block 238, CRCC block 240, FIFO register 242, and monitor 244 perform manipulations and organizational functions to place the data in a form that is more easily used by the rest of the host interface. Subcode SR 246 is a shift register for receiving the serial subcode information SUB as it is received from the servo controller circuitry. Subcode SR 246 has input SFSY and output RCK. SFSY provides synchronization functionality, while RCK provides clocking. Another control input SBSY may also be included to indicate the start of the sector. Q-channel registers 248 hold the bits that make up the Q-channel, which provides control information for the current sector. The Q-channel is assembled by reading the subcode information SUB at timed intervals according to the RCK clock signal. Subcode FIFO register 250 provides the subcode information to the buffer manager.

The determination of the format of a CD proceeds in the following manner: The Q-channel bits are saved from the subcode SR 246 to Q-channel registers 248. Bit 6 of the first 8 bit register of each sector is the CD-ROM bit, which indicates whether the current sector is of the CD-ROM type or the CD-DA type. The CD-ROM bit is stored for convenient access. Next, the SYNC detect/sector byte counter 234 indicates to the monitor 244 when the header and subheader data is available from the descrambler 238 to be saved and checked for the mode of the current sector. Finally, the duplicate subheader values in FIFO 242 are compared to the subheader values in FIFO 242 to determine the form of the current sector.

Host Buffer Access Circuitry

The host buffer access circuitry uses the sector format information generated by the optical storage format identification circuitry described above to generate a sector format word, (the MDFM byte), that contains format information for the current sector. The sector format word is a binary representation containing information pertaining to the format of the sector.

Figure 11:
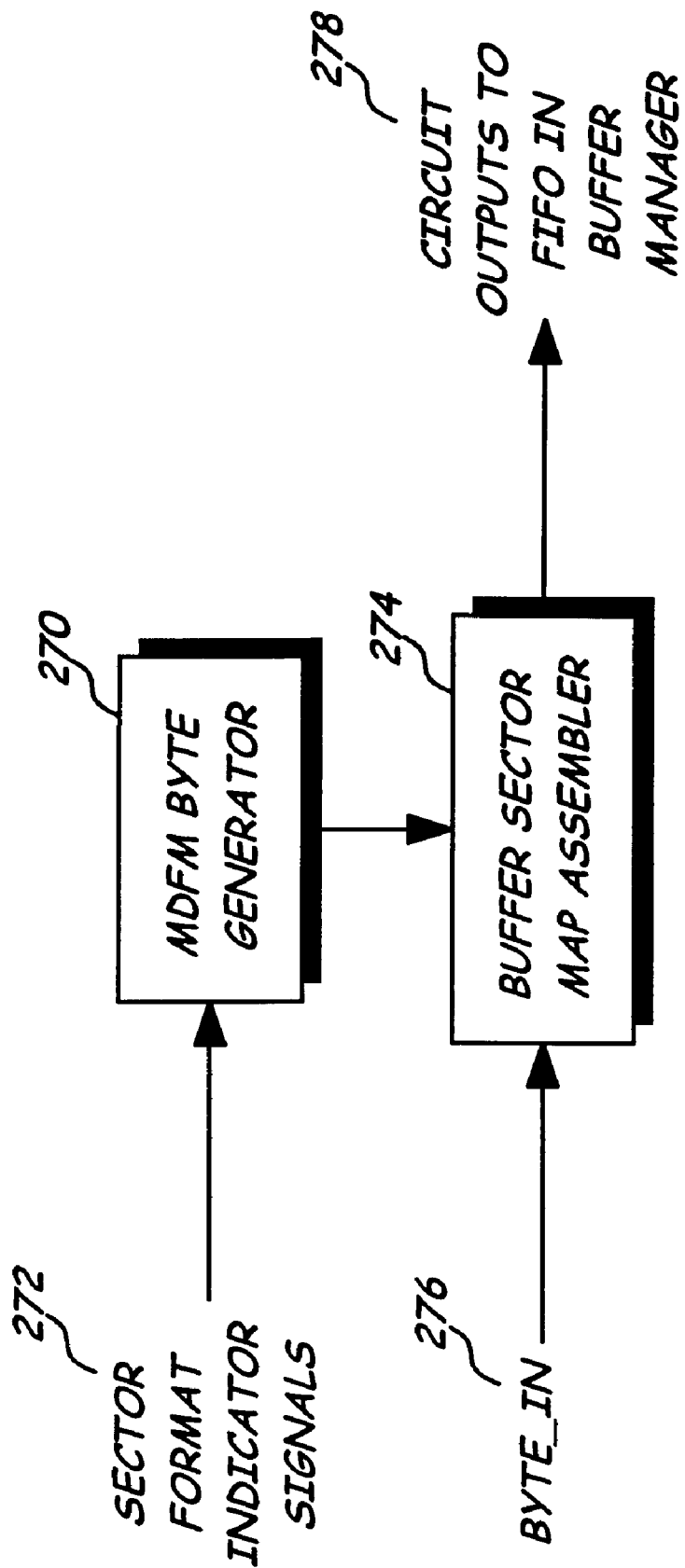
FIG. 11 is a block diagram of logic circuitry used to generate an MDFM byte for storage in the buffer.

FIG. 11 shows a representation of the preferred embodiment of logic used to generate the MDFM byte for storage in the buffer. MDFM byte generator 270 receives sector format indicator signals 272 from the format identification circuitry described above. The sector format indicator signals 272 include a DECODE signal, which indicates whether the data is CD-ROM or CD-DA data. A 2-bit MODE signal bus indicates the mode if the data is CD-ROM data. The 2-bit MODE signal represents Mode-0, Mode-1, or Mode-2 by carrying the logic values 00, 01, or 10, respectively. A FORM signal indicates the form of a Mode-2 CD-ROM sector. A logic value of 1 on the FORM signal indicates a Form-2 sector, while a logic value of 0 indicates a Form-1 sector. A FORM0 signal indicates a condition in which a Mode-2 CD-ROM sector subheader has discrepancies that indicate that it is not Form-1 or Form-2.

In the preferred embodiment, the sector format indicator signals 272 described above are produced by the format identification circuitry. These sector format indicator signals 272 are then gated inside the MDFM byte generator 270 to produce intermediate signals. The combinations of sector format indicator signals 272 causing the intermediate signals to be set high are shown below in Table 3.

TABLE 3

| INTERMEDIATE SIGNALS | DECODE | MODE | FORM | FORM0 |
|---|---|---|---|---|
| AUDIO (HIGH) | 0 | — | — | — |
| MODE0 (HIGH) | 1 | 00 | — | — |
| MODE1 (HIGH) | 1 | 01 | — | — |
| MODE2 (HIGH) | 1 | 10 | — | — |
| MODE2_FORM0 (HIGH) | 1 | 10 | — | 1 |
| MODE2_FORM1 (HIGH) | 1 | 10 | 0 | 0 |
| MODE2_FORM2 (HIGH) | 1 | 10 | 1 | 0 |

The intermediate signals include the following: An AUDIO signal, which is set high when DECODE has a value of 0, a MODE0 signal which is set high when DECODE has a value of 1 and MODE has a value of 0 (00), a MODE1 signal which is set high when DECODE has a value of 1 and MODE has a value of 1 (01), a MODE2 signal which is set high when DECODE has a value of 1 and MODE has a value of 2 (11), a MODE2_FORM0 signal which is set high when DECODE has a value of 1 and MODE has a value of 2 (10) and FORM0 has a value of 1, a MODE2_FORM1 signal which is set high when DECODE has a value of 1 and MODE has a value of 2 (10) and both FORM and FORM0 have values 10 of 0, and a MODE2_FORM2 signal which is set high when DECODE has a value of 1, MODE has a value of 2, FORM has a value of 1, and FORM0 has a value of 0.

MDFM byte generator 270 uses the sector format indicator signals 272 to construct the MDFM byte to be stored in the buffer. If the logic value of MODE1 is 1, then MDFM is set to 4 (0000100). If the logic value of MODE1 is 0, then MODE2_FORM0 is examined. If the logic value of MODE2_FORM0 is 1, then MDFM is set to 8 (00001000). If the logic value of MODE1 is 0, MODE2_FORM0 is 0, and MODE2_FORM1 is 1, then MDFM is set to 9 (00001001). If MODE1 is 0, MODE2_FORM0 is 0, MODE2_FORM1 is 0, and MODE2_FORM2 is 1, then MDFM is set to 10 (00001010). These byte values are exemplary only, and other byte values may be used if the circuitry used to access the MDFM byte is adjusted accordingly.

Once the MDFM byte has been constructed by the MDFM byte generator 270, the MDFM byte is then received by the buffer sector map assembler 274. BYTE_IN 276 is a signal received by the buffer sector map assembler 274 that indicates that a data byte has been sent to the buffer manager. A counter is used to determine when all 2637 bytes of data have been sent. When the last byte for a particular sector is sent, the MDFM byte is added into the queue of the First-In-First-Out (FIFO) register that sends the data to the buffer manager. Upon receipt of the MDFM byte by the buffer manager, simple logic circuitry in the buffer manager places the MDFM byte in an appropriate prespecified location in the sector map in the buffer memory. In the preferred embodiment, the MDFM byte is stored at byte location 3036 in the sector map.

A representation of the buffer memory sector map for a single sector is shown below in Table 4. The preferred embodiment uses a 16-bit wide buffer for the sector map. Other buffer widths, such as 8-bit or 32-bit, may be used if the address and length values are adjusted accordingly. Both CD-ROM data fields and CD-DA data fields are shown. The data map for a Mode-2 Form 2 sector matches the CD-DA data map. Start and End addresses are given in both hexadecimal and decimal form, and length is given in decimal form.

TABLE 4

| Start hex | End hex | Start dec | End dec | Length dec | CD-Rom Data | CD-DA Data |
|---|---|---|---|---|---|---|
| 0 × 000 | 0 × 5 | 0 | 5 | 6 | Synch Field | Audio Data |
| 0 × 6 | 0 × 7 | 6 | 7 | 2 | Header | Audio Data |
| 0 × 8 | 0 × 407 | 8 | 1031 | 1024 | Frame Data | Audio Data |
| 0 × 408 | 0 × 409 | 1032 | 1033 | 2 | EDC (CRC Parity) | Audio Data |
| 0 × 40A | 0 × 40D | 1034 | 1037 | 4 | Zero Field | Audio Data |
| 0 × 40E | 0 × 463 | 1038 | 1123 | 86 | P-Parity | Audio Data |
| 0 × 464 | 0 × 497 | 1124 | 1175 | 52 | Q-Parity | Audio Data |
| 0 × 498 | 0 × 52A | 1176 | 1322 | 147 | Error Flags | Error Flags |
| 0 × 52B | 0 × 52B | 1323 | 1323 | 1 | Longitudinal Parity | Longitudinal Parity |
| 0 × 52C | 0 × 52D | 1324 | 1325 | 2 | CRC Remainder | NOT USED |
| 0 × 52E | 0 × 583 | 1326 | 1411 | 86 | P Syndromes | NOT USED |
| 0 × 584 | 0 × 5B7 | 1412 | 1463 | 52 | Q Syndromes | NOT USED |
| 0 × 5B8 | 0 × 5E7 | 1464 | 1511 | 48 | Subcode (P-W) | Subcode (P-W) |
| 0 × 5E8 | 0 × 5ED | 1512 | 1517 | 6 | Q Channel | Q Channel |
| 0 × 5EE | 0 × 5EE | 1518 | 1518 | 1(MSB) | MDFM | MDFM |
| 0 × 5EE | 0 × 5EE | 1518 | 1518 | 1(LSB) | Q Channel Status | Q Channel Status |
| 0 × 5EF | 0 × 5FF | 1519 | 1535 | 17 | NOT USED | NOT USED |

Each sector uses 3.0 kilobytes (KB) of data stored in 16-bit words. The MDFM byte, as constructed from the sector format identification method and circuitry described above, is written to location 0×5EE as the most significant byte. The MDFM byte contains bits that reflect the mode (Mode-0, Mode-1, or Mode-2 ) and the form (Form-0, Form-1, and Form-2) of the sector. The format of the MDFM byte is 0×0000MMFF, where MM are two bits corresponding to the mode of the sector, and FF are two bits corresponding to the form of the sector.

Data from the optical disc is stored in the buffer in the same order, regardless of the mode and form. The data is stored in sector map locations 0×000 through 0×497.

When a data retrieve request is received, the MDFM byte is read first and decoded to determine the type of sector being retrieved. One to four data retrieval fields can be read out of the sector map for each sector transferred to the host. These data fields, labeled A, B, C, and D in the preferred embodiment, can each be used to transfer a portion of the mapped data to the host. The four fields, A, B, C, and D, may be configured by having the microprocessor set registers that point to the start and end locations in the sector map from which the data will be retrieved. This allows combinations of requested fields to be sent automatically.

If, however, a disc contains both CD-ROM data and CD-DA data, or both Mode-2 Form-1 CD-ROM data and Mode-2 Form-2 data, the data fields for the different formats of resident sectors are not the same size. CD-ROM or Mode-2 Form-1 CD-ROM data is located at map locations 0x008–0x407, CD-DA data is located at map locations 0x000–0x497, and Mode-2 Form-1 data is located at map locations 0x008–0x497.

In order to accommodate the variations in data field sizes among different resident sector formats, the Field-A data field is assigned special functions. When Field-A is used, the sector type is automatically monitored, and the start and end points of Field-A are adjusted as required by the data field size.

Figure 12:
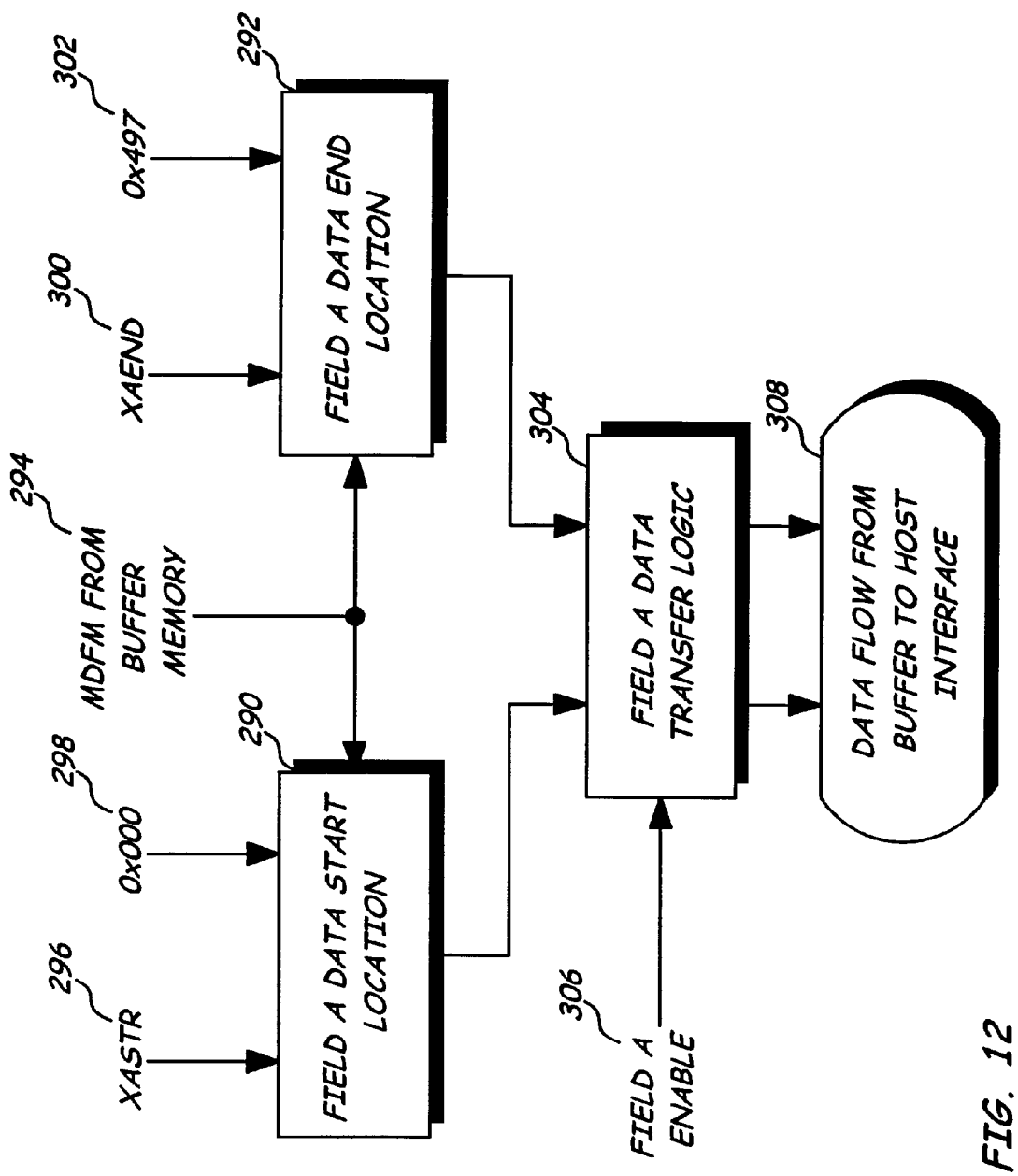
FIG. 12 is a block diagram of logic circuitry used to decode the MDFM byte retrieved from the buffer.

FIG. 12 shows a representation of the logic circuitry used to decode the sector format word (the MDFM byte) retrieved from the buffer. The decoded MDFM byte is used to create a data location identifier. In the preferred embodiment, the data location identifier consists of a start location and an end location. A data field adjuster sets the location of data to be retrieved. Field-A Data Start Location 290 sets the Field-A start location as an index from the beginning of the sector map. Field-A Data End Location 292 sets the Field-A end location as an index from the beginning of the sector map. decoder logic for decoding sector format word In the preferred embodiment, there are at least three input signals to Field A Data Start Location 290. The first signal contains a representation of the MDFM byte 294 (as read from the sector map in the buffer memory). The second signal is XASTR signal 296, an 11-bit registered value that is written by the microprocessor and specifies the location in the sector map where data will begin transferring if the MDFM byte indicates that the current sector is not a CD-DA sector or a Mode-2 Form-1 CD-ROM sector. The third input signal to the Field A Data Start Location 290 is a hardwired 11-bit value 298 that specifies the location in the sector map where data will begin transferring if the MDFM byte indicates that the current sector is a CD-DA sector or a Mode-2 Form-1 sector. In the preferred embodiment, signal 298 is hardwired to hex address 0x000.

In the preferred embodiment, there are at least three input signals to Field A Data End Location 292. The first signal contains a representation of the MDFM byte 294 (as read from the sector map in the buffer memory). The second signal is XAEND signal 300, an 11-bit registered value that is written by the microprocessor and specifies the location in the sector map where data will stop transferring if the MDFM byte indicates that the current sector is not a CD-DA sector or a Mode-2 Form-1 CD-ROM sector. The third input signal to the Field A Data End Location 292 is a hardwired 11-bit value 302 that specifies the location in the sector map where data will stop transferring if the MDFM byte indicates that the current sector is a CD-DA sector or a Mode-2 Form-1 sector. In the preferred embodiment, signal 302 is hardwired to hex address 0x497.

Field-A data start location is set by Field A Data Start Location block 290. If MDFM byte signal 294 has a hex value of 0x0A or 0x00, then the Field-A data start location is set to hex address 0x000, as specified by hardwired signal 298. Otherwise, the Field-A data start location is set to the hex address value on signal XASTR 510.

Field-A data end location is set by Field A Data End Location block 292. If MDFM byte signal 294 has a hex value of 0x00, then the Field-A data start location is set to hex address 0x497, as specified by hardwired signal 302. Otherwise, the Field-A data start location is set to the hex address value on signal XAEND 512.

After the Field-A data start location has been set by Field A Data Start Location block 290 and the Field-A data end location has been set by Field A Data End Location block 292, Field A Data Transfer Logic circuitry 304 selects the data to be read from the buffer within the current sector map. Field A Data Transfer Logic circuitry 304 may be enabled or disabled by setting the Field A Enable signal 306 high or low, respectively. If Field A Enable signal 306 is set low, then no data is sent. If Field A Enable signal 306 is set high, then the start and end locations from Field A Data Start Location block 290 and Field A Data End Location block 292 are used to set the start and end pointers for the data block to be read.

Data Flow from Buffer to Host Interface block 308 represents the logic and First-In-First-Out (FIFO) circuitry that performs the data transfer from the buffer to the host interface.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for identifying a sector format in a sector of an optical disc, wherein information in the sector includes a data portion and a subcode portion, comprising the steps of:

(a) polling a data type indicator bit from a subcode portion of a sector of an optical disc; and (b) returning a first signal in response to the data type indicator bit, wherein the first signal is representative of the data type of the sector of the optical disc.

2. The method of claim 1, further comprising the steps of:

(c) extracting mode indicator bits from a data portion of the sector when the first signal is representative of a CD-ROM type sector; and (d) returning a second signal in response to the mode indicator bits, wherein the second signal is representative of the mode of the sector of the optical disc.

3. The method of claim 2, further comprising the steps of:

(e) extracting a first set of subheader bytes and a second set of subheader bytes when the second signal is representative of a Mode-2 CD-ROM sector;

(f) comparing the first set of subheader bytes with the second set of subheader bytes;

(g) polling a form indicator bit in the first set of subheader bytes when the first set of subheader bytes is equivalent to the second set of subheader bytes, and (f) returning a third signal in response to the form indicator bit, wherein the third signal is representative of the form of the sector of the CD disc.

4. The method as described in claim 1, further comprising adjusting a size of a data field in a buffer memory based upon the returned first signal.

5. The method as described in claim 1, wherein polling includes:

receiving streaming data from a sector of optical disc;

generating a timing signal relative to the streaming data;

processing an at least one bit of data within said data stream into a parallel format, segregating said subcode portion; and identifying at least one periodic channel within said subcode portion.

6. An apparatus for determining a sector format of an optical disc from a digital information stream, wherein the digital information stream includes a subcode portion and a data portion, comprising:

a clock for generating a timing signal relative to incoming bits of the digital information stream;

a serial-to-parallel converter for processing incoming bits of the digital information stream according to the clock;

a first register for storing the subcode portion;

a first counter for identifying within the stored subcode portion a periodic channel;

sector type identification logic for decoding the periodic channel to determine whether the channel indicates a particular sector type; and a first signal for identifying the particular sector type indicated by the periodic channel.

7. The apparatus of claim 6 wherein the optical disc comprises a compact disc according to the Digital Compact Disc standard.

8. The apparatus of claim 6 wherein the first signal identifies between a CD-ROM and a CD-DA optical disc.

9. The apparatus of claim 6 wherein the subcode portion comprises ninety-eight frames containing two synchronization frames and ninety-six subcode frames, and wherein each subcode frame contains one byte of subcode information.

10. The apparatus of claim 6 wherein the periodic channel comprises a Q-channel.

11. The apparatus of claim 6 wherein the sector type identification logic comprises a first comparator.

12. The apparatus of claim 6, further comprising:

a second register for storing the data portion;

a second counter for identifying a header;

sector mode identification logic for decoding the header to determine whether the header indicates a particular sector mode; and a second signal for identifying the particular sector mode indicated by the header.

13. The apparatus of claim 12, wherein the digital information stream includes CD-ROM sectors.

14. The apparatus of claim 12, wherein the second signal identifies a Mode-0 CD-ROM sector, a Mode-1 CD-ROM sector, or a Mode-2 CD-ROM sector.

15. The apparatus of claim 12, wherein the header comprises four header bytes.

16. The apparatus of claim 12, wherein the sector mode identification logic comprises a second comparator.

17. The apparatus of claim 12, further comprising:

a third counter for identifying a subheader and a duplicate subheader;

sector form identification logic for decoding the header and duplicate subheader to determine whether the header and duplicate subheader indicate a particular sector form; and a third signal for identifying the particular sector form indicated by the header.

18. The apparatus of claim 17, wherein the digital information stream includes CD-ROM/XA sectors.

19. The apparatus of claim 17, wherein the second signal identifies a no form Mode-2 CD-ROM sector, a Form-1 Mode-2 CD-ROM sector, or a Form-2 Mode-2 CD-ROM sector.

20. The apparatus of claim 17, wherein the subheader comprises four subheader bytes and the duplicate subheader comprises four duplicate subheader bytes.

21. The apparatus of claim 17, wherein the sector form identification logic comprises a third comparator.

22. The apparatus of claim 17, wherein the second counter is the third counter.

23. A method for identifying a sector format in a sector of an optical disc, wherein information in the sector includes a data portion and a subcode portion, comprising the steps of:

(a) polling a data type indicator bit from a subcode portion of a sector of an optical disc;

(b) returning a first signal in response to the data type indicator bit, wherein the first signal is representative of the data type of the sector of the optical disc;

(c) extracting mode indicator bits from a data portion of the sector wherein the first signal is representative of a CD-ROM type sector;

(d) returning a second signal in response to the mode indicator bits, wherein the second signal is representative of the mode of the sector of the optical disc;

(e) extracting a fist set of subheader bytes and a second set of subheader bytes when the second signal is representative of a Mode-2 CD-ROM sector;

(f) comparing the first set of subheader bytes with the second set of subheader bytes;

(g) polling a form indicator bit in the first set of subheader bytes when the first set of subheader bytes is equivalent to the second set of subheader bytes; and (h) returning a third signal in response to the form indicator bit, wherein the third signal is representative of the form of the sector of the optical disc.

24. An apparatus for determining a sector format of an optical disc from a digital information stream, wherein the digital information stream includes a subcode portion and a data portion, comprising:

a clock for generating a timing signal relative to incoming bits of the digital information stream:

a serial-to-parallel converter for processing incoming bits of the digital information stream according to the clock;

a first register for storing the subcode portion;

a first counter for identifying within the stored subcode portion a periodic channel;

sector type identification logic for decoding the periodic channel to determine whether the channel indicates a particular sector type;

a first signal for identifying the particular sector type indicated by the periodic channel;

a second register for storing the data portion;

a second counter for identifying a header;

sector mode identification logic for decoding the header to determine whether the header indicates a particular sector mode; and a second signal for identifying the particular sector mode indicated by the header.

25. The apparatus of claim 24, wherein the digital information stream includes optical disc sectors.

26. The apparatus of claim 24, wherein the second signal identifies at least one of a Mode-0 CD-ROM sector, a Mode-1 CD-ROM sector, and a Mode-2 CD-ROM sector.

27. The apparatus of claim 24, wherein the header comprises four header bytes.

28. The apparatus of claim 24, wherein the sector mode identification logic comprises a second comparator.

29. The apparatus of claim 24, further comprising:

a third counter for identifying a subheader and a duplicate subheader;

sector form identification logic for decoding the header and duplicate subheader to determine whether the header and duplicate subheader indicate a particular sector form; and a third signal for identifying the particular sector form indicated by the header.

30. The apparatus of claim 29, wherein the digital information stream includes CD-ROM XA sectors.

31. The apparatus of claim 29, wherein the second signal identifies at least one of a No Form Mode-2 CD-ROM sector, a Form-1 Mode-2 CD-ROM sector, and a Form-2 Mode-2 CD-ROM sector.

32. The apparatus of claim 29, wherein the subheader comprises four subheader bytes and the duplicate subheader comprises four duplicate subheader bytes.

33. The apparatus of claim 29, wherein the sector form identification logic comprises a third comparator.

34. A method for adjusting a size of a data field in buffer memory based upon a data type of a section of an optical disc, comprising:

(a) polling a data type indicator bit from a subcode portion of a sector of an optical disc; and (b) returning a first signal in response to the data type indicator bit, wherein the first signal is representative of a data type of the sector of the optical disc; and (c) adjusting a size of a data field in a buffer memory based upon the returned first signal.

* * * * *